United States Patent [19]

de Méré

[11] 4,121,115

[45] Oct. 17, 1978

[54] D. C. POWER PACKS, INTER ALIA OF THE DISPOSABLE KING, FOR PROVIDING A PREDETERMINED RATED VOLTAGE

[75] Inventor: Henri Courier de Méré, Paris, France

[73] Assignee: Bicosa Societe de Recherches, France

[21] Appl. No.: 750,648

[22] Filed: Dec. 15, 1976

[30] Foreign Application Priority Data

Dec. 18, 1975 [FR] France .................. 75 38878

[51] Int. Cl.² .............................................. H02J 7/00
[52] U.S. Cl. ..................................... 307/150; 363/18
[58] Field of Search ................ 307/150, 151; 331/112; 363/15, 16, 18, 19, 20, 21, 30, 97, 131

[56] References Cited

U.S. PATENT DOCUMENTS

| 3,077,563 | 2/1963 | Combs et al. ............... 307/150 X |
| 3,702,961 | 11/1972 | Erikson ..................... 363/19 |
| 3,958,168 | 5/1976 | Grundberg .................. 331/112 X |

OTHER PUBLICATIONS

Patent Associated Literature, "Stabilized Low Voltage D.C. Power Supply For Use with Thermal Conductivity Meters", D. F. Powell, Laboratory Practice, vol. 24, No. 7, pp. 471–472, Jul. 1975.

Primary Examiner—William M. Shoop
Attorney, Agent, or Firm—Pennie & Edmonds

[57] ABSTRACT

A power pack for a d.c. energized device, the power pack providing a predetermined d.c. voltage and being of given shape and dimensions, its output terminals having predetermined positions. This power pack includes a casing having the given external shape and dimensions and two output terminals in said predetermined positions. Inside the casing a d.c. power supply is provided adapted to deliver an on-load d.c. voltage lower than the said predetermined d.c. voltage, and a low consumption converter circuit for converting a signal from the d.c. power supply into a d.c. voltage signal of the predetermined value. The signal from the converter circuit is applied across the output terminals.

13 Claims, 6 Drawing Figures

D. C. POWER PACKS, INTER ALIA OF THE DISPOSABLE KING, FOR PROVIDING A PREDETERMINED RATED VOLTAGE

The invention relates to a power pack adapted to provide a predetermined d.c. voltage and having a given external shape and dimensions, its output terminals having predetermined positions.

The invention also relates to a disposable d.c. power pack.

Electrical cells have generally given external shapes and dimensions; consequently, devices requiring a d.c. power supply can be formed with a recess of a shape and size adapted to a particular kind of cell or to a particular number of cells. However an important disadvantage of normal cells is their limited life for a given size.

It is therefore an object of the invention to provide a d.c. power pack which is of predetermined shape and dimensions and which has a long life.

It is another object of the invention to enable such a power pack to be produced simply and at low cost.

The power pack according to the invention therefore comprises a casing having the given external shape and dimensions, the casing having two output terminals in the predetermined positions, there being provided in the casing: at least one d.c. power supply, such as a cell or battery accumulator, and a converter circuit energized by the d.c. power supply and outputting a signal to the output terminals, the converter circuit having a low power consumption, inter alia when no load is connected across the power pack, the converter circuit output voltage being greater than the on-load output voltage of the d.c. power supply.

Preferably, the converter circuit in the casing is disposed on a printed circuit board.

Advantageously, control electrode type switching means are provided which in the no-load state inhibit operation of the converter circuit and therefore the drain on the d.c. power supply.

As a variant of the latter feature, inhibiting means can be provided to inhibit operation of the converter circuit — and therefore energization of the elements thereof by the d.c. power supply, these inhibiting means including an element which is outside the casing and which is adapted to be fitted between two additional terminals on the outside of the casing.

Preferably, the converter circuit includes oscillating means comprising a transistor and a high-Q (or overvoltage coefficient) winding, the oscillating means being energized by the d.c. supply, the converter circuit having provision for boosting the voltage of the oscillating means and comprising such winding, and rectifying means. Advantageously in this case, and as described in the first certificate of addition No. 73 35 152 to French Patent Application No. 72 38 011, the oscillating means comprise a second transistor whose collector is connected to the base of the first transistor, a capacitor being disposed between the collector of the first transistor and the base of the second transistor, the high-Q winding being disposed in the collector circuit of the first transistor. Preferably, the first and second transistors are of opposite kinds of conductivity. Advantageously too, rectifying means are provided, which comprise a rectifying element and a capacitor chargeable by the signal output of the of the voltage-boosting means. Preferably in this case, means are provided to regulate the voltage across the latter capacitor, the latter means comprising a Zener diode whose cathode is connected to one side of the latter capacitor and whose anode is connected to the base of the second transistor.

Advantageously, in cases in which inhibiting means of the kind hereinbefore defined are provided and the converter circuit comprises transistorized oscillating means and a high-Q winding, the outside element of the inhibiting means has short circuiting means which can be removed, inter alia when the power pack is used for the first time, the short-circuiting means being adapted to be disposed in the base circuit of the transistor of the oscillating means.

The invention also relates to a disposable power pack adapted to provide a predetermined rated d.c. voltage. According to the invention, such a power pack comprises a casing having a given external shape and dimensions, the casing having two output terminals in fixed positions, there being provided in the casing at least one cell adapted to output an on-load d.c. voltage lower than the said predetermined d.c. voltage, and a low-consumption converter circuit for converting the signal output of the cell into a d.c. voltage signal of the predetermined value, the signal from the converter circuit being applied across the said output terminals.

Other objects, advantages and features of the invention will become apparent from the following description of some embodiments of the invention reference being made to the accompanying drawings wherein.

Figure 1:
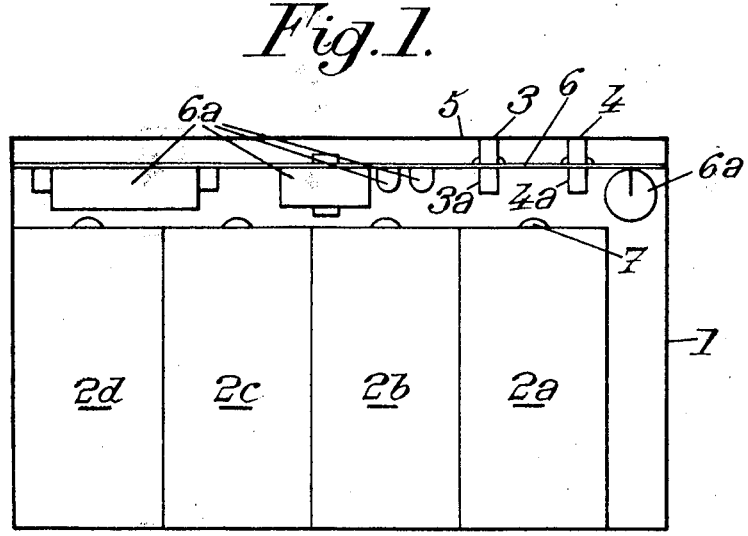
FIG. 1 is a view in side elevation, with the front of the casing removed, of a power pack according to this invention.

Referring to FIG. 1, a d.c. power pack according to the invention comprises a casing 1 and, disposed therein, a d.c. power supply which in the exemple shown is embodied by a set of 8 cells; only four cells 2a, 2b, 2c, 2d are shown in FIG. 1. In the present example the 8 cells are all identical and are connected in series with one another. The power pack also comprises two output terminals 3, 4 on the top surface 5 of casing 1; in the present example the terminals 3, 4 are in the form of two metal sockets 3a, 4a.

Also provided in casing 1 is a printed circuit board 6 containing the various items 6a of a converter circuit of which some embodiments will be described with reference to FIGS. 2 to 6. The converter circuit output terminals are soldered to the sockets 3a, 4a, and the board 6 is according formed with two apertures through which the sockets 3a, 4a extend. By way of a connection which is not shown, the positive terminal 7 of cell 2a is connected to a first converter circuit input which takes the form of a point on board 6; the negative terminal of the final cell is connected to the second input of the converter circuit. The negative terminal can course be grounded.

The function of the converter circuit is to boost the on-load d.c. voltage provided by the d.c. power supply embodied by the cells. Consequently, in cases in which the power pack according to the invention is required to replace a power pack of the same shape and same external dimensions as the casing 1 and providing the same d.c. voltage between its output terminals, the effective capacity expressed in ampere-hours of the power pack according to the invention is greater than that of the conventional power pack to be replaced since, for a given size, a low-voltage cell has an appreciably higher capacity than a single cell or a set of cells providing a higher d.c. voltage. To take advantage of this feature, the converter circuit provided in the casing must not of course take up too much space in relation to the space taken up by the cells. Advantageously, therefor the converter circuit is provided on a printed circuit board 6; also, at least a considerable proportion of its components is embodied in integrate circuit form and therefore takes up little space.

In experiments relating to the invention, the inventor also found that the on-load d.c. voltage provided by a cell or set of cells decreases appreciably after a period of use and to a greater extent than the off-load voltage. This decrease in on-load voltage with time is therefore a factor in decreasing the working life of such cells. Consequently, in an embodiment of the invention to be described hereinafter with reference to FIG. 4, the converter circuit outputs a fixed voltage lower than the rated off-load voltage of a d.c. supply embodied by a cell or set of cells. However, the fixed voltage output of the converter circuit is greater than the on-load voltage provided by the cell or cells.

In any case, what is important for all embodiments of the invention is that boosting the voltage is a means of increasing cell life since the cells can continue to be used even when their voltage has become relatively low. In other words, power can be derived at a low potential.

To make adequate use of the advantage provided by boosting the voltage, the self-consumption of the converter circuit must be slight, particularly in off-load conditions. It is also advantageous to have a very high efficiency converter circuit and so, as previously stated and as will be seen hereinafter, a converter circuit of the kind disclosed by French Pat. No. 72 38 011 and the first certificate of addition No. 73 35 152 thereto can be used.

Figure 2:
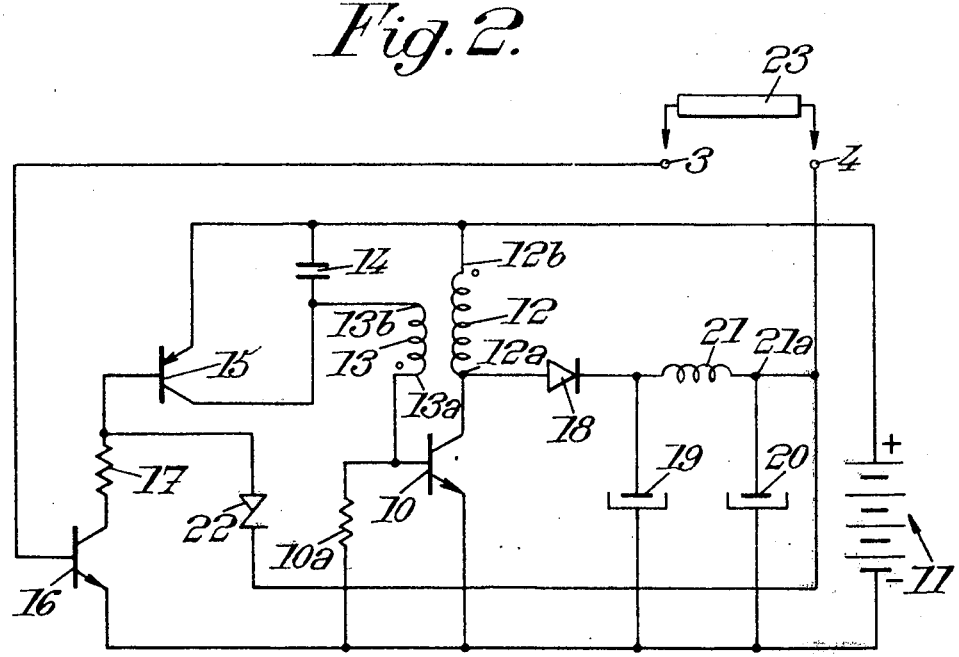
FIG. 2 is a view, in the form of a circuit diagram, of another embodiment of a power pack according to the invention.
Figure 3:
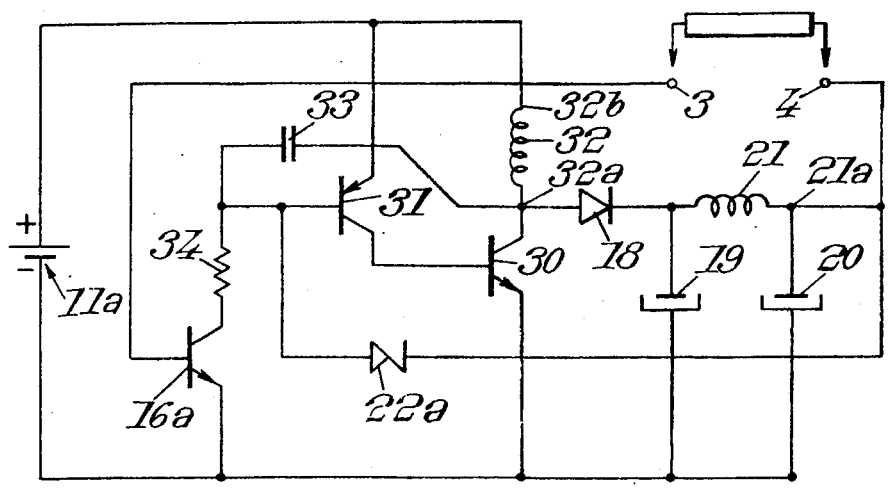
FIG. 3 is a variant of the power pack of FIG. 2.
Figure 4:
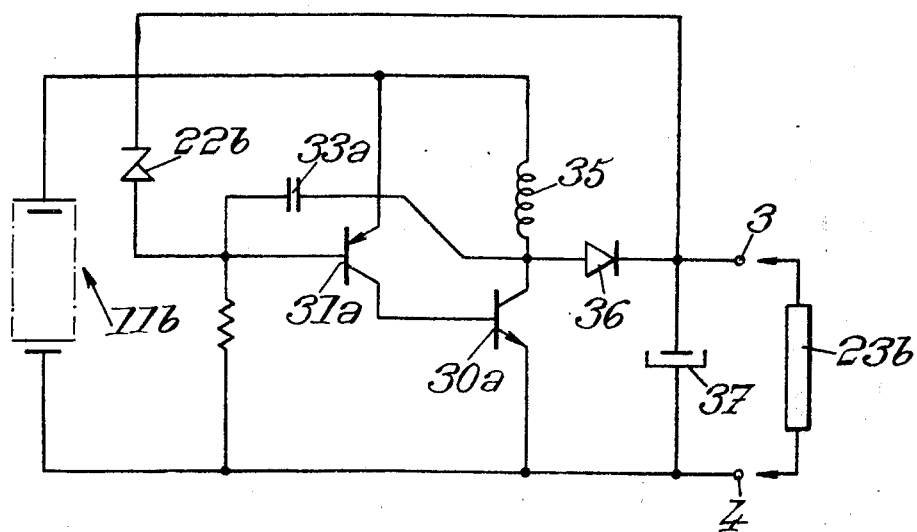
FIG. 4 shows, in the form of a circuit diagram, another embodiment of the invention.

In the converter circuit embodiments shown in FIGS. 2, 3 and 4, means are provided to inhibit or considerably limit the consumption of the circuit in off-load conditions. In the embodiments of the converter circuit to be described with reference to FIGS. 5 and 6, means are provided which substantially prevent any consumption by the converter circuit before it is first taken into use.

In the power pack embodiment for which a circuit diagram is given in FIG. 2, the converter circuit comprises a blocking oscillator comprising a NPN type transistor 10; the emitter thereof is connected to the negative (−) pole of the d.c. supply 11 and the collector is connected to a terminal 12a of a high-Q winding 12. The second terminal 12b of winding 12 is connected to the positive pole (+) of supply 11. Winding 12 is wound on a ferrite core (not shown) forming a closed gapless circuit. A second winding 13 having fewer turns than winding 12 is wound on the same core; one terminal 13a of winding 13 is connected to the base of transistor 10 and the other terminal 13b is connected to the positive (+) pole of supply 11 by way of a capacitor 14. The converter circuit also comprises a PNP type amplifying transistor 15 having its emitter connected to the (+) pole and its collector connected to terminal 13b.

The base of transistor 10 is connected to the (−) pole by way of a resistance 10a providing bias for the base of transistor 10.

The base of transistor 15 is controlled by a switching transistor 16. The collector thereof is connected to the base of transistor 15 via a resistance 17, and the emitter of transistor 16 is connected to the (−) pole of supply 11. The base of transistor 16 is connected to output terminal 3.

The signal output of the oscillating and voltage-boosting circuit arrangement is rectified by a rectifying circuit comprising a diode 18 whose anode is connected to terminal 12a. The rectifying circuit also comprises a single-$\pi$ smoothing circuit comprising two capacitors 19, 20 and a choke 21. Capacitor 19 is disposed between the cathode of diode 18 and the emitter of transistor 10. Choke 21 is connected between the cathode of diode 18 and one side of capacitor 20. The other sides of the capacitors 19, 20 are connected to the emitter of transistor 10. The choke terminal 21a connected to capacitor 20 is also connected to output terminal 4 and to the cathode of a Zener diode 22 whose anode is connected to the base of amplifying transistor 15.

In one embodiment, the transistors 10, 15 and 16 are of the 2N2890, BC 205 A and BC 208 A types, the capacitor 14 has a capacitance of 22 nF and the capacitors 19, 20 have a capacitance of 100 $\mu$F each. The inductance 12 is 100 mH, the inductance 13 is 2 mH and the choke 21 is 500 $\mu$H. The diode 18 is of the 1 N 4148 kind and the Zener diode 22 is of the BZX55C12 kind, with a Zener voltage of 12 volts. Resistance 17 has a value of 4.7 kilohms and resistance 10a has a value of 100 ohms. The d.c. power supply is embodied by 8 R 14 type manganese dioxide, $MnO_2$, alkaline cells each rated at 1.5 volts and 5 AH capacity.

The circuit shown in FIG. 2 operates as follows.

In the off-load state — i.e., when a load 23 is not connected between terminals 3 and 4 — the base of transistor 16 is disconnected and so no base-emitter current can flow therethrough. Transistor 16 is therefore cut off and the oscillator comprising the transistor 10 cannot operate. However, when the load 23 is connected between the terminals 3 and 4, the charge of the capacitors 19, 20 can discharge through the impedance represented by the load 23 and the base-emitter path of transistor 16. The same therefore becomes conductive and therefore makes the transistor 15 conductive too. The oscillator comprising the transistor 10 can therefore operate and recharge capacitors 19, 20. The function of the Zener diode 22 is to keep constant the signal which the converter circuit outputs across the terminals 3 and 4.

In the embodiment shown in FIG. 3 the converter circuit is of the kind described in the aforesaid certificate of addition No. 73 35 152. More particularly, it is a converter circuit which in this example comprises two transistors 30, 31 of opposite types of conductivity - NPN and PNP respectively. The converter circuit also comprises a high-Q inductance 32 having one end 32a connected to the collector of transistor 30 and its other end 32b connected to the (+) pole of the d.c. supply 11a. The collector of transistor 30 is connected to the base of transistor 31 by way of a capacitor 33 and the collector of transistor 31 is connected to the base of transistor 30 whose emitter is connected to the (−) pole of the power supply 11a.

The rectifying circuit is exactly the same as in the embodiment described with reference to FIG. 2; like elements of the rectifying circuit therefore have the same reference numerals.

Again as in the embodiment of FIG. 2, the circuit shown in FIG. 3 comprises a switching transistor 16a whose emitter is connected to the (−) pole of the supply 11a and whose base is connected to terminal 3. The collector of transistor 16a is connected to the base of transistor 31 via a resistance 34. A regulating Zener diode 22a is provided between output terminal 21a and the base of transistor 31.

In one actual embodiment the transistors 30, 31, 16a are of the 2 N 2890, BC 205 A and BC 208 A types respectively and the inductance 32 has a value of 100 mH and is wound on a ferrite ring — i.e., a closed gapless magnetic circuit. Capacitor 33 has a capacitance of 180 pF and resistance 34 has a value of 4.7 kilohms. The Zener diode 22a is of the BZX55C12 type and the d.c. power supply 11a is embodied by 8 R 14 cells.

The circuit just described with reference to FIG. 3 operates in virtually the same way as the circuit shown in FIG. 2 and so its operation need not be described. However, the converter circuit of the kind shown in FIG. 3 is more efficient than the one shown in FIG. 2 — i.e., power wastage due to the elements of the converter circuit is less in the case of FIG. 3 than in the case of FIG. 2.

In the embodiment shown in FIG. 4, the converter circuit is also of the kind comprising two transistors 30a, 31a of opposite types of conductivity, a high-Q winding 35 and, disposed between the collector of transistor 30a and the base of transistor 31a, a capacitor 33a. These items are interconnected just like the corresponding items of FIG. 3. However, the rectifying circuit comprises a diode 36 having its anode connected to the collector of transistor 30a, a capacitor 37 being connected between the cathode of diode 36 and the emitter of transistor 30a. In this embodiment the output terminals 3, 4 are connected one to each side of a capacitor 37. The cathode of diode 36 is connected to the base of transistor 31a via a regulating Zener diode 22b whose cathode is connected to the cathode of diode 36.

The Zener voltage of diode 22b is less than the rated off-load voltage of power supply 11b but higher than the on-load d.c. voltage thereof since of course the on-load voltage of a d.c. supply is less than its off-load voltage because of the internal resistance of the supply. Consequently, the Zener diode 22b is conductive in the off-load state and thus helps to cut off the transistor 31a and inhibit operation of the converter circuit. However, when a load 23b is connected between terminals 3 and 4 — i.e., across capacitor 37 — the voltage thereacross decreases, as does the voltage provided by supply 11b, with the result that the circuit arrangement comprising the transistors 30a, 31a and the winding 35 operates as an oscillator, the Zener diode 22b having a regulating effect. In one actual embodiment of the system shown in FIG. 4, the rated off-load d.c. voltage of the supply 11b is of the order of 12 volts and the Zener voltage of the Zener diode 22b is of the order of 10 volts.

Although the Zener diode 22b is conductive in the off-load state, the power consumption of the system in the off-load state is negligible since the current drain on the supply 11b is something like 10 μA.

Also, if — particularly right at the very start of use of the cell type supply 11b — the on-load voltage of the supply 11b is too high to prevent reverse conduction of the Zener diode 22b, the same delivers to the load 23b through inductance 35 and diode 36. In other words, the converter circuit serves to boost the d.c. voltage provided by the supply 11b only when the on-load voltage thereof drops below a threshold substantially equal to the sum of the Zener voltage of diode 22b and of the emitter-base voltage of transistor 31a.

The circuit arrangement just described with reference to FIG. 4 is therefore a means of appreciably lengthening the life of a power pack including cells. Also, the cell can continue to be used even when its voltage has become very low.

As in the embodiment just described with reference to FIG. 4, the embodiment shown in FIG. 5 comprises a circuit arrangement having two transistors 30c, 31c and a high-Q inductance 35c, while a capacitor 33c is provided between the collector of transistor 30c and the base of transistor 31c. Again as in FIG. 4 the rectifying circuit comprises a diode 36c and a capacitor 37c. The output terminals 3, 4 are connected one to each side of the capacitor 37c. A Zener diode 22c is connected between the cathode of diode 36c and the base of transistor 31c.

Figure 5:
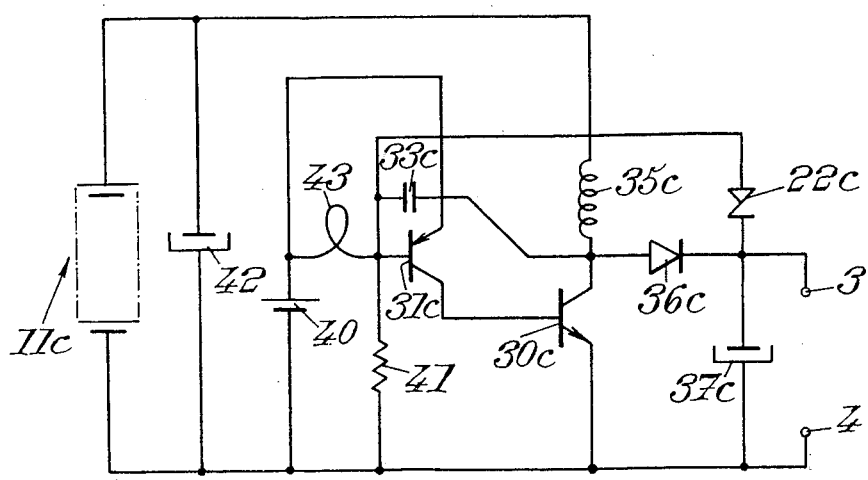
FIG. 5 shows another embodiment of a power pack according to the invention.

In the circuit arrangement in FIG. 5 the transistor 31c is biassed not directly by the supply 11c but by an auxiliary supply 40 whose positive pole is connected to the emitter of the PNP transistor 31c and whose negative pole is connected to the base of transistor 31c by way of a biassing resistance 41. The d.c. voltage provided by the auxiliary supply is appreciably lower than the voltage provided by the main supply 11c so as to improve the stability of the d.c. available at the terminals 3 and 4. A smoothing capacitor 42 is connected across the supply 11c.

According to another feature of the invention, the embodiment now being described comprises shortcircuiting means inhibiting operation of the converter circuit, and therefore any drain on the cell, when the circuit is not in use. To this end, a conductor 43 extends from the positive pole of supply 40 to the base of transistor 31c, applies a positive potential to the latter base and therefore provides a permanent cut-off of transistor 31c. Transistor 30c is therefore cut off as well, so that no power can be drawn from the supply 11c.

The conductor 43 takes the form of a loop of wire adapted to be removed when the power pack according to the invention is first taken into use. In other words the loop 43 performs two functions — in the first place when the power pack is in store the loop 43 greatly inhibits any drain on the supply 11c, and in the second place the loop 43 serves as a safeguard that the power pack has not been used.

Upon removal of loop 43 the converter circuit draws a current; however, the current thus drawn is relatively weak, being less than 1 mA in the example being described. This leakage current is tolerable for some uses, more particularly in association with high-capacity cells.

Figure 6:
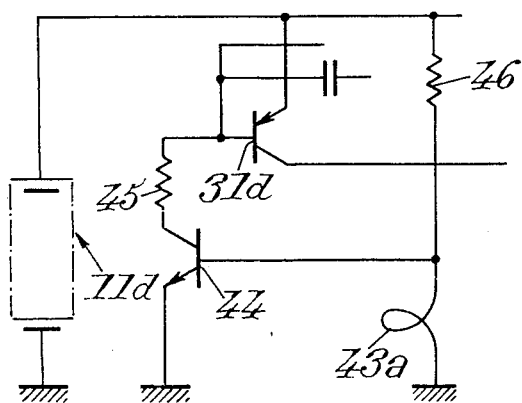
FIG. 6 shows a variant of FIG. 5.

In FIG. 6, which shows a variant of the circuit arrangement shown in FIG. 5, a transistor 31d is biassed by the supply 11d and not by an auxiliary supply, and the transistor base biassing circuit comprises an NPN type transistor 44 whose collector is connected to the base of transistor 31d via a biassing resistance 45 and whose emitter is grounded — i.e., in the present example, connected to the negative pole of supply 11d. The base of transistor 44 is grounded through a conductive loop 43a similar to the loop 43 of FIG. 5 and is also connected to the positive pole of supply 11d by a biassing resistance 46. When the loop 43a is connected in this way between the base of transistor 44 and ground transistor 44 is non-conductive, transistor 31d is also non-conductive and, as in the case in FIG. 5, there is virtually no drain on the supply 11d. In one actual embodiment the resistance 46 has a value of 10 megohms and the resistance 45 has a value of 10 kilohms.

It is advantageous for the loop 43 (or 43a) to be readily accessible, and so the loop extends beyond the outside of the casing 1. Alternatively, the loop can be replaced by a rider which can be placed when the power pack is not in use, in which event two (female) terminals must be provided on the outside of casing 1.

In all the embodiments a rider can be provided in series with the or each cell to obviate any drain on the supply.

The d.c. power pack hereinbefore described with reference to FIGS. 1 to 6 has a wide variety of possible uses. For instance, it can be used instead of a conventional power pack provided outside or inside a device. It can even be used instead of an ordinary cell, in which event the term "casing" is to be construed as meaning the normal outer cladding or covering of the cell, another cell or cell element and the converter circuit being provided in such "casing". The power pack according to the invention always has a conventional external appearance and is devoid of outside switch.

In addition to the advantages mentioned, the number of cells required for a power pack according to the invention is less than the number required for a conventional power pack devoid of converter circuit, with the result that there is less risk of accidents. Also, the converter circuit can be embodied using low-cost elements and so the power pack according to the invention can be discardable — i.e., not reusable by replacement of cells.

Clearly, and as the foregoing shows, the invention is not limited to those of its uses and constructions which have been more particularly considered but covers all the variants. More particularly, it is not essential to use a transistor as switching means in the embodiments of FIGS. 2 and 3, and a thyristor or a relay or even just a rider can be used instead. Alternatively too, when a number of cells are used they need not necessarily be arranged in series with one another, for instance, they can be combined in a series-parallel arrangement such as 4 cells in series with one another and in parallel with 4 other cells in series with one another.

I claim:

1. A power pack for a d.c. energized device, adapted to provide a predetermined d.c. voltage, said power pack having a casing of a given external shape and dimension, and supporting two output terminals located in predetermined positions, said casing including therein at least one d.c. power supply, such as a cell, adapted to output an on-load d.c. voltage lower than the said predetermined d.c. voltage and a low-consumption converter circuit for converting a signal from the d.c. power supply into a d.c. voltage signal of the predetermined value, the signal from the converter circuit being applied across the said output terminals, and control electrode type switching means, said switching means connected between one of said outpt terminals and said d.c. power supply and controlled by a load across said terminals such that in a no-load state said switching means inhibits operation of said converter circuit and the drain on the d.c. power supply.

2. A power pack according to claim 1, wherein the converter circuit is disposed on a printed circuit board in the casing.

3. A power pack according to claim 1 wherein the converter circuit includes: oscillating means comprising a transistor and, disposed in the collector circuit thereof, a high-Q winding such oscillating means being energized by the d.c. power supply; means for boosting the voltage of the oscillating means; said boosting means comprising said winding; and means for rectifying the signal output of the voltage-boosting means.

4. A power pack according to claim 3, wherein the oscillating means comprise a second transistor disposed in the base circuit of the first transistor.

5. A power pack according to claim 1 wherein the converter circuit includes: oscillating means comprising a first and a second transistor, the second transistor being disposed in the base circuit of the first transistor, and, installed in the collector circuit of said first transistor, a high Q winding, said oscillating means being energized by the d.c. power supply; means for boosting the voltage of the oscillating means, said boosting means comprising said winding; and means for rectifying the signal output of the voltage boosting means; and wherein the control electrode type switching means is disposed in the base circuit of the second transistor, the control electrode type switching means comprising a control transistor whose base is connected to said one output terminal such that, when a load is connected across the output terminals, a conductive path is provided between one terminal of the d.c. power supply and the control electrode.

6. A power pack according to claim 4 wherein the oscillating means comprise a capacitor connected between the collector of the first transistor and the base of the second transistor.

7. A power pack according to claim 4 wherein the rectifying means, comprise a capacitor chargeable by the voltage boosting means; and the converter also comprises regulating means comprising a Zener diode whose cathode is connected to one side of the latter capacitor and whose anode is connected to the base of the second transistor of the oscillating means.

8. A power pack according to claim 7 wherein its output terminals are connected one to each side of the capacitor of the rectifying means.

9. A power pack according to claim 8 wherein the Zener diode voltage of the Zener diode is less than the rated off-load d.c. voltage of d.c. power supply but greater than the on-load voltage thereof.

10. A power pack for a d.c. energized device adapted to provide a predetermined d.c. voltage, said power pack having a casing of a given external shape and dimension, and supporting two output terminals located in predetermined positions, said casing including therein at least one d.c. power supply, such as a cell, adapted to output an on-load d.c. voltage lower than the said predetermined d.c. voltage and a low-consumption converter circuit for converting a signal from the d.c. power supply into a d.c. voltage signal of the predetermined value, said converter circuit including oscillating means comprising a transistor, a high Q winding disposed in the collector circuit of said transistor, and short circuiting means in the base circuit of said transistor adapted to inhibit operation of the converter circuit and any drain on the d.c. power supply, the short circuiting means being adapted to be removed when the power pack is in use, said oscillating means being energized by the d.c. power supply; means for boosting the voltage of the oscillating means, said boosting means comprising said winding; and means for rectifying the signal output of said converter circuit which is applied across said output terminals.

11. A power pack according to claim 10 wherein the short-circuiting means comprise a loop of conductive wire which can be pulled out when the power pack is used for the first time.

12. A power pack according to claim 10 wherein the oscillating means of the converter circuit comprise a second transistor and a capacitor, the same being disposed between the collector of the first transistor and the base of the second transistor, the collector of the second transistor being connected to the base of the first transistor, the winding of the voltage-boosting means being connected to the collector of the first transistor and the shortcircuiting means being so arranged in the base circuit of the second transistor as to render the same nonconductive.

13. A disposable power pack for providing a predetermined rated d.c. voltage and comprising a casing of a given external shape and dimension and having two output terminals in fixed positions, and the casing enclosing at least one cell element adapted to output an on-load d.c. voltage less than the said predetermined rated d.c. voltage; a low-consumption converter circuit for converting a signal from the cell into a d.c. voltage signal of the predetermined rated value, the signal from the converter circuit being applied across the said output terminals; and, means for inhibiting operation of the converter circuit, said inhibiting means being connected between one of said output terminals and said cell element and controlled by a load across said terminals, said inhibiting means connected to for controlling said converter circuit such that in a no-load state said converter circuit is inoperative and there is no drain on said cell element.

* * * * *